United States Patent
Arvin

(10) Patent No.: US 7,251,542 B2
(45) Date of Patent: Jul. 31, 2007

(54) APPARATUS AND METHOD FOR MACHINING WORKPIECES

(76) Inventor: Joseph L. Arvin, 13246 Wood Duck Dr., Plainfield, IL (US) 60544

( * ) Notice: Subject to any disclaimer, the term of this patent is extended or adjusted under 35 U.S.C. 154(b) by 0 days.

(21) Appl. No.: 10/820,522

(22) Filed: Apr. 8, 2004

(65) Prior Publication Data
US 2005/0171631 A1   Aug. 4, 2005

Related U.S. Application Data

(60) Provisional application No. 60/461,080, filed on Apr. 8, 2003.

(51) Int. Cl.
G06F 19/00 (2006.01)
(52) U.S. Cl. ........................ 700/159; 700/184
(58) Field of Classification Search ............... 700/159, 700/98, 118, 182, 160, 164, 184
See application file for complete search history.

(56) References Cited

U.S. PATENT DOCUMENTS

| | | |
|---|---|---|
| 4,068,558 A | 1/1978 | Loos |
| 4,334,810 A | 6/1982 | Behnke et al. |
| 4,412,765 A | 11/1983 | Occhialini |
| 4,565,081 A | 1/1986 | Massee |
| 5,091,861 A | 2/1992 | Geller et al. |
| 5,146,670 A | 9/1992 | Jones |
| 5,154,553 A | 10/1992 | Baumstark |
| 5,659,478 A * | 8/1997 | Pennisi et al. ................ 700/95 |
| 5,675,229 A | 10/1997 | Thorne |
| 5,785,771 A | 7/1998 | Mitchell, Jr. et al. |
| 5,810,522 A | 9/1998 | Parker |
| 5,901,595 A | 5/1999 | Massee |
| 5,960,661 A | 10/1999 | Massee |
| 6,012,022 A * | 1/2000 | Michiwaki .................. 702/168 |
| 6,074,481 A | 6/2000 | Bittner et al. |
| 6,079,090 A | 6/2000 | Ongaro |
| 6,080,349 A | 6/2000 | Bittner et al. |
| 6,741,901 B2 * | 5/2004 | Lu et al. ....................... 700/97 |

OTHER PUBLICATIONS

Nanlawla, Michael, "Robotic Automated Deburring of Aerospace Gears", Gear Technology, Jan./Feb. 2001.
"New Gear Software", Gear Technology, Jan./Feb. 2003.

* cited by examiner

*Primary Examiner*—Zoila Cabrera
(74) *Attorney, Agent, or Firm*—Jerry A. Schulman

(57) ABSTRACT

Disclosed are apparatus and methods for manufacturing complex gears includes the creation of a data set to control a robotic machine tool enabling the tool to machine the contours of the gears accurately after the gear has been cut. Each gear is mounted to an indexable chuck which is used to position the gear for machining operations such as chamfering and deburring that heretofore have been done by hand. A machine cabinet allows debris from machining to be recovered by a vacuum-operated system and an air-cooling system cools the gear during machining without requiring the use of cooling oils or other liquids.

12 Claims, 10 Drawing Sheets

APPARATUS AND METHOD FOR MACHINING WORKPIECES

RELATED APPLICATION

This application claims the benefit of provisional patent application Ser. No. 60/461,080, entitled "Apparatus and Method for Machining Workpieces", filed Apr. 8, 2003.

FIELD OF INVENTION

The present invention relates generally to computer-directed machining apparatus and, more particularly, to apparatus and methods for carrying out such machining operations as chamfering, deburring, reaming, honing and polishing forged, extruded or machined metal parts.

BACKGROUND OF THE INVENTION

It is a common industrial technique to use computer-controlled and computer-set cutting machines to cut complex shapes into solid metal blanks. One example of a typical and widespread use of this technique is the manufacture of gears, such as spiral and hypoid bevel, spur and helical gears used in automobiles and trucks. After the gears are manufactured they must be deburred to remove excess metal flashing or burrs and may also undergo chamfering to finish the individual gear teeth.

Automated chamfering and deburring machines are known for relatively simple gear configurations, such as those made and sold by Redin Corporation of Rockford, Ill., Mutschler Technologies, Inc. of North Ridgeville, Ohio and GMI of Independence, Ohio. Other machines have been developed to chamfer and deburr more complex gear shapes such as spiral bevel and hypoid gears. One such machine is made and sold by the Gleason Works of Rochester, N.Y., but can only machine the drive side of each gear tooth. This is acceptable and satisfactory for automotive applications but not for such complex gears such as aerospace-quality spiral and hypoid bevel gears, which require precise chamfers on all tooth edges. Such complex aerospace gears are often made in complex geometric shapes and require precision machining to extremely precise tolerances in order to perform satisfactorily. They must also be as lightweight as possible, meaning the gear teeth are made as small as possible yet must withstand maximum load or torque because they are often incorporated in the drive trains of aircraft such as airplanes, helicopters and spacecraft such as the space shuttle.

In an article entitled, "Robotic Automated Deburring of Aerospace Gears," written by Michael Nanlawala, which appeared in the January/February 2001 issue of *Gear Technology* magazine, the author describes in detail some of the post-manufacturing processes that are critical to the proper manufacture and performance of complex aerospace gears. In particular, the author states: "Machining processes, such as milling, drilling, turning, hobbing or other gear tooth cutting operations, create burrs on the edges of metal parts when the cutting tool pushes material over an edge rather than cutting cleanly through the material. The size, shape and characteristics of the resulting burrs depend upon a number of process factors, such as tool material and its hardness, tool sharpness, tool geometry, cutting forces, ductility of the material being machined, the speed and feed of the cutting tool, and the depth of cut. A subsequent deburring operation is generally required after those machining processes to remove loose burrs from the machined edge and to apply a chamfer to remove the sharp corners. In addition to the removal of loose burrs, the deburring of the edge produces benefits, such as the removal of sharp edges, increasing the ease of assembly, prevention of edge chipping or breakage, and improvement of air [sic] flow over the edge of rotating parts. Removing sharp edges by deburring and chamfering also eliminates the possibility of stress concentration and increases fatigue life."

Divots, nicks or cuts formed by uneven or discontinuous chamfering can create stress risers in the manufactured gear which can lead to premature failure of the gear. Heretofore, the most common method of removing burrs and applying chamfers to gear teeth has been the use of manual machining tools applied by a workman to the gear surfaces. Because complex gears have many such surfaces and because the intersection of these surfaces often requires reversal and repositioning of the hand grinder in order to create a continuous chamfer, hand-working such a gear is a laborious and time consuming and relatively imperfect technique. It is not uncommon to have a 30 to 40% rejection rate for hand-chamfered and deburred gears.

As reported by *Nanlawala*, manual deburring has been associated with safety hazards arising from such injuries as cuts, splinters, burns, bruises and eye injuries as well as arthritis, carpal tunnel syndrome and pulmonary illness caused by the inhalation of material ground from the gear blank. Chamfering and deburring a workpiece such as a gear housing can take up to six hours of manual labor with less than reproducibly accurate results.

A typical process used to manufacture aerospace quality gears uses computer controlled or manually set manufacturing or hobbing machines to cut the gear profile from a solid metallic blank. Examples of such a manufacturing tool are the gear cutting machines manufactured by the Gleason Corporation of Rochester, N.Y.

Attempts have been made to use computer-controlled machining tools to perform the chamfering and deburring operations presently being done manually. For example, in the *Nanlawala* article, a number of tools and computer-controlled tool heads are proposed for use in automatic chamfering and deburring operations. None of these combinations of hardware, computer software and tools has proven to be successful on a commercial scale. In particular, *Nanlawala* focuses on the use of force-controlled machining heads. Machining performed by such heads is controlled by the amount of force required to keep the head in contact with the surface or edge to be machined. In order to carry out such an operation, *Nanawala* describes the use of path programming to teach a computer-controlled robotic machining arm the path required to be followed about the gear periphery in order to carry out the deburring and chamfering operations.

Path programming as described by *Nanlawala* uses the "teach pendant" method which requires physically moving the robotic cutting head to a selected point along the gear periphery and recording the position of that point in the computer's memory as well as the orientation of the robotic arm required to machine that point along the gear periphery.

Next, the machining head is moved to a second point and, again, the location of this point as well as the orientation of the machining head is recorded. When a sufficient number of these points are so recorded, it should then theoretically be possible to use the program created to successfully chamfer and deburr the gear. In practice, this trial and error procedure is extremely time-consuming, requires frequent repositioning to adjust the angle of the machining tool to the workpiece and results in wasted workpieces. Moreover, it must be repeated for each gear type whenever a new run of gears is manufactured.

A desirable alternative to the teach pendant technique would be the ability to "model" the gear surfaces in a computer and to use the model to control the machining operation. Computer modeling of complex gears such as spiral bevel aerospace gears is described in an article entitled "New Gear Software" which appears in the January/February 2003 issue of *Gear Technology* magazine. However, use of the software is limited to creating on-screen solid model depictions of the gears and allowing gear assemblies to be virtually assembled to verify how they fit together. The author of the software is reported as saying: " . . . he doesn't recommend his latest version for creating the geometry needed to manufacture a spiral bevel gear by traditional metal-cutting methods." Thus the "New Gear Software" models the gear blank to create a computer image but cannot be used to cut or machine the gear blank.

Examples of the need for chamfering and deburring and attempts at computer-controlled machining operations to carry out these operations are well represented in the prior art.

U.S. Pat. No. 5,091,861 (Geller et al) teaches and describes a system for automatic finishing of machine parts in which the inventors describe the desirability of an automatic, computerized finishing system for machined workpieces and, in particular, state that "Automatic computerized systems for deburring are not known to the inventors." (col. 1, lines 25-27). This reference teaches the use of solid modeling techniques to deburr straight edges.

U.S. Pat. No. 5,146,670 (Jones) teaches and describes profiling and deburring of workpieces having straight edges.

U.S. Pat. No. 5,675,229 (Thorne) teaches and describes apparatus and methods for adjusting robot positioning which describes in detail the teach pendant method used to generate data sets.

U.S. Pat. No. 6,079,090 (Ongaro) teaches and describes a numeric-control machine tool for turning and hobbing mechanical parts which states at col. 4, lines 26-32 that the apparatus is capable of chamfering but does not describe how the tool is controlled to carry out the chamfering and includes no discussion of complex gear shapes.

U.S. Pat. No. 5,785,771 (Mitchell Jr., et al.) teaches and describes a method for manufacturing precision gears. At col. 1, lines 26-37, the inventors describe with particularity the manufacture of such gears and the advantage to reducing or eliminating the number of scrapped workpieces resulting from said manufacture. At lines 61-64 of col. 1, the inventors confirm the value of the chamfering operation by stating that chamfering reduces stress concentrations in the completed gear.

U.S. Pat. No. 6,074,481 (Bittner, et al.) teaches and describes a masking tool for manufacturing precision gears and method for making same.

U.S. Pat. No. 6,080,349 (Bittner, et al.) teaches and describes a masking tool for manufacturing precision gears and method for making same. This patent is a division of the '41 patent and further particularizes the masking technique described therein.

U.S. Pat. No. 5,810,522 (Parker) teaches and describes a hand-held bar edging tool and support therefor, an example of a hand drill accessory used for hand deburring and chamfering of bar stock.

U.S. Pat. No. 5,154,533 (Baumstark) teaches and describes an apparatus for chamfering and deburring the end edges of a toothed production gear, an example of an apparatus specifically designed to hand-chamfer and deburr the outer edge of a specific gear. U.S. Pat. No. 4,412,765 (Occhialini) teaches and describes an apparatus for facilitating chamfering/deburring tool and gear meshing, an example of another non-automated apparatus designed to treat specific gears.

U.S. Pat. No. 4,334,810 (Behnke et al) teaches and describes a gear deburring apparatus and method. This reference uses a non-automated drive gear to mesh with the gear workpiece to carry out the machining operation needed to deburr the gear. U.S. Pat. No. 4,068,558 (Loos) teaches and describes a device for deburring or chamfering of the face edges of gears, including helical gears, in which a series of guide discs and cutters specifically designed for each different gear is used to chamfer or deburr the axial edges of the gear teeth.

U.S. Pat. No. 5,960,661 (Massee) teaches and describes an apparatus for a workpiece showing a computer controlled apparatus moveable in two dimensions which does not describe chamfering or deburring.

U.S. Pat. No. 5,901,595 (Massee) teaches and describes an apparatus for machining a workpiece which is a second example of a machining device controlled by a central controller but does not include the capacity for chamfering and deburring. U.S. Pat. No. 4,565,081 (Massee) teaches and describes a forming machine as yet another example of a memory controlled machining device which does not teach or describe chamfering or deburring.

None of these references teaches nor discloses a method to chamfer and deburr the complex surfaces of a precision spiral gear, together with the capacity to perform other common machining processes such as drilling, honing, reaming, polishing and buffing, nor the apparatus to carry out such a method.

BRIEF DESCRIPTION OF THE INVENTION

The present invention resides in the computer modeling of the topography of a workpiece, such as a complex gear, by using the data created by a workpiece inspection program and adapting this data to guide a robotic apparatus to carry out such machining operations as deburring, chamfering, honing, reaming and polishing.

Manufacturing a workpiece such as a complex aerospace gear begins with the creation of a drawing of the gear in accordance with the specifications required by the gear designer. Typical specified parameters are, for example, the number of gear teeth, the pitch and angle of the teeth, the addendum or dedendum of the gear surfaces, the face angle of the blank, the gear root angle, the outside diameter of the gear, and for spiral bevel gears, the direction of the spiral.

A test gear is then manufactured and evaluated. Another software product supplied by Gleason is the GAGE program which digitally describes the gear tooth topography to create an inspection file. This file is used with inspection devices such as the Hoffler-Zeiss machine to inspect finished gears for accuracy. Any necessary corrections that must be made in order to produce a satisfactory gear are then carried out by modifying the machine settings.

I have found, surprisingly, that the data created by the GAGE program can be used to computer-model the gear tooth contours with sufficient accuracy and specificity to crete a data set that can be used with a computer controlled robotic arm on which is mounted a selected machining tool. This data set can be input directly into the program used to operate the robotic arm. This means that individual points on complex gear contours such as hypoid and spiral bevel gears can be described in terms of their x, y and z coordinates with sufficient specificity to guide a machining tool mounted to a robotic control arm to carry out accurately a finishing operation such as deburring, chamfering, grinding, reaming, honing or polishing. This technique allows the successful modeling of the gear tooth topographies in three dimensions using the data from the original CAD file used to create the gear tooth drawings and with sufficient accuracy to allow robotic machining of complex surfaces, i.e., operations such as honing, reaming, chamfering, polishing and the like.

While other software is used with other gear cutting machines, for the purposes of this description the data file created by the software used to determine the gear cutting machine settings will be called the "CAGE" file, while the inspection data file used to model the gear topography and set the x, y and z coordinates for the inspecting machine will be referred to as the "GAGE" file.

In a preferred embodiment of the present invention, a commercially available robotic arm, commonly supplied with the operating software necessary to control the movement of the arm is mounted on a work surface and a commercially available grinder is mounted to the working end of the robotic arm. A commercially available CNC indexable chuck is also attached to the work surface and the gear to be deburred or chamfered is mounted on the chuck. A data set created from the GAGE file is input to the operating software for the robotic arm, making the data readable by the robot which is then instructed to machine a selected portion of the gear periphery. When that portion is completed, the chuck rotates to bring a next section of the gear into position for machining and these operations are repeated until the gear tooth contours, toe-to-heel have been chamfered and deburred.

It is extremely important during these operations to make sure that the chamfered surfaces are continuous and where the machining tool is required to undergo a change in orientation to follow a surface that no divots, nicks or other discontinuities are created because such discontinuities will give rise to stressors which will shorten the operating life and reliability of the gear. This will require repositioning and reorientation of the machining tool to follow the gear contour and may make it desirable to keep the tool in a first orientation to machine some surfaces, then reposition the tool and machine the remaining surfaces, rather than attempting to machine in a single operation that tracks the surface continuously.

For workpieces that require multiple finishing operations, commercially available interchangeable tool heads are used so that a first head may be used for the chamfering and deburring operations then replaced by the robot with a second head to be used, for example, to ream holes or keyways formed in the workpiece which, in turn, may be replaced by a third head used to polish other surfaces of the workpiece.

Although the deburring and chamfering of a complex hypoid or spiral bevel gear has formed the basis for the foregoing examples, it is also contemplated that many other workpieces such as gear casings and jet engine blades and vanes may also be finished using the above described process.

Preferably, the work surface, robotic arm, chuck and associated tooling are enclosed within a cabinet and a filtration system is used to draw air into the cabinet thereby capturing the metallic dust and other material machined from the gear blank and trapping it in the filtration system. A flow of supercooled air is directed at that portion of the gear surface being machined to act as a cooling medium at the point of tool contact without the attendant mess and hazard of using a stream of liquid coolant such as oil or water-based coolants to cool the workpiece.

While the following describes a preferred embodiment or embodiments of the present invention, it is to be understood that this description is made by way of example only and is not intended to limit the scope of the present invention. It is expected that alterations and further modifications, as well as other and further applications of the principles of the present invention will occur to others skilled in the art to which the invention relates and, while differing from the foregoing, remain within the spirit and scope of the invention as herein described and claimed. Where means-plus-function clauses are used in the claims such language is intended to cover the structures described herein as performing the recited functions and not only structural equivalents but equivalent structures as well. For the purposes of the present disclosure, two structures that perform the same function within an environment described above may be equivalent structures.

BRIEF DESCRIPTION OF THE DRAWINGS

These and further aspects of the present invention may be more fully appreciated by considering the accompanying drawings in which a spiral bevel gear will be used as exemplary of the apparatus and methods preferred to practice the invention. In the drawings, in which like figures refer to like parts.

DETAILED DESCRIPTION OF THE DRAWINGS

Figure 1:
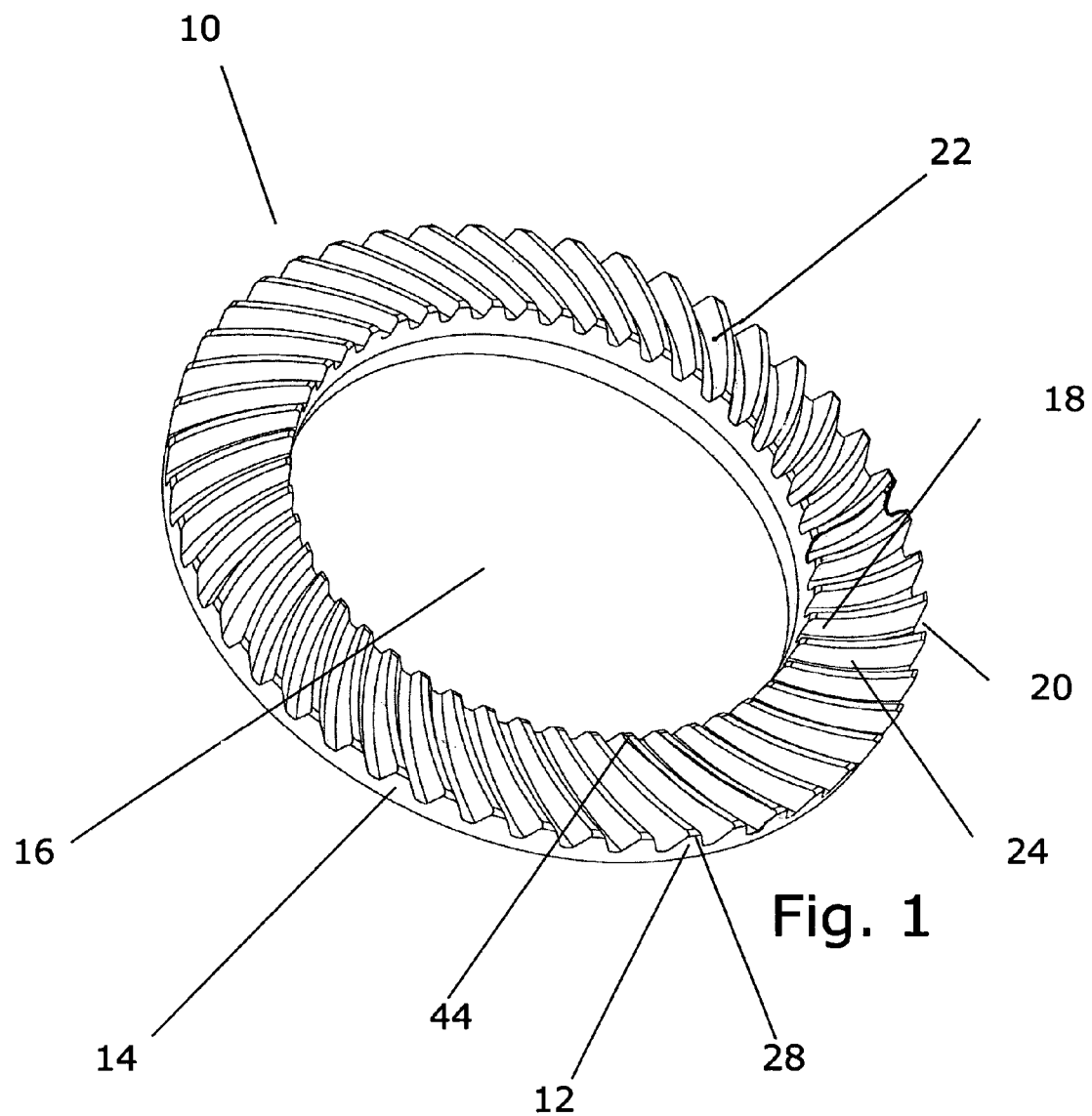
FIG. 1 is a perspective view of a spiral bevel gear manufactured by a gear cutting machine.

Referring to FIG. 1, the numeral 10 indicates generally a spiral bevel gear formed as a ring having a series of gear teeth 12 cut on an outer rim 14 and having a central opening 16. Gear teeth 12 are identical in dimension and configuration and each gear tooth 12 has a toe 18 and a heel 20. The geometry of gear 10 is such that each gear tooth has a concave surface 22 and a convex surface 24 and is curved toe to heel.

Figure 2:
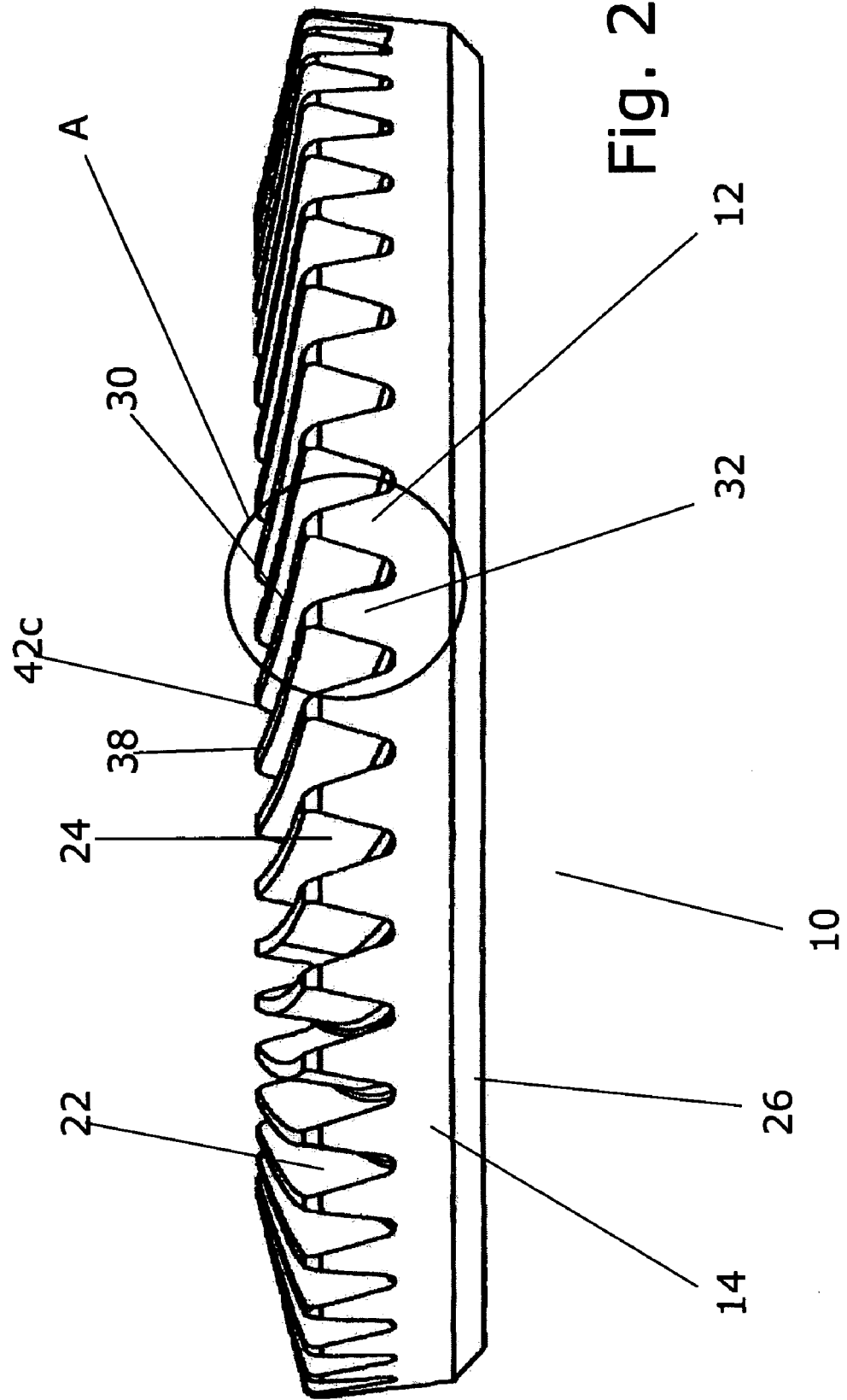
FIG. 2 is a lateral elevation of the gear of FIG. 1.
Figure 3:
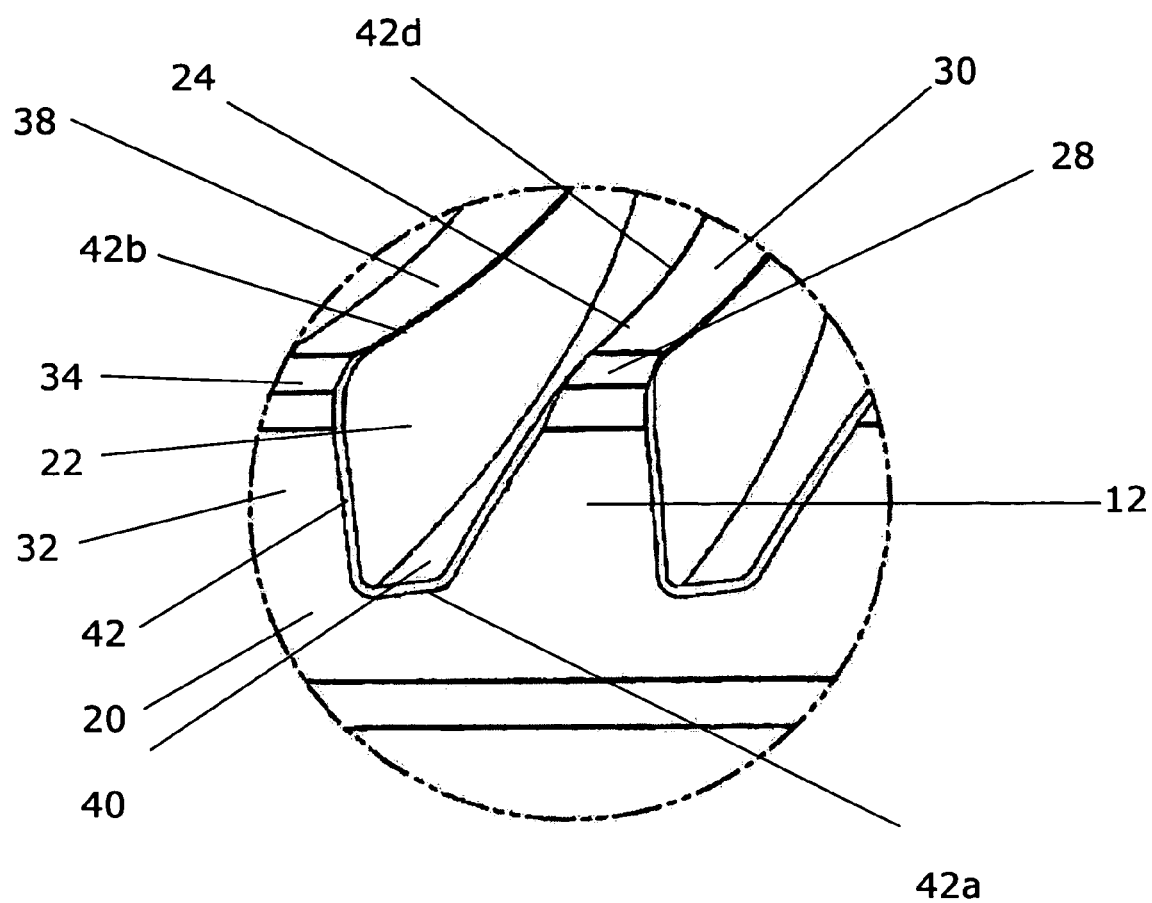
FIG. 3 is an enlarged detail A of FIG. 2 showing the gear teeth.

Referring to FIG. 2, it can be seen that rim 14 has a beveled lower surface 26. Referring to FIG. 3, a portion of the gear in FIG. 2 shown in detail A is enlarged and shows that each gear tooth 12 has at its heel a heel chamfer 28 formed between heel 20 and gear top land 30. As also seen in FIG. 3, adjacent gear tooth 32 has a similar heel chamfer 34 formed between heel 20 and top land 38. In the example selected, adjacent gear teeth about the periphery of gear 10 are identical in relationship as that of adjacent gear teeth 12 and 32.

Gear teeth 12 and 32 form, therebetween, a root 40 generally described as the bottom of the groove or valley formed between adjacent gear teeth and extending heel to toe. Each gear tooth has a tooth profile comprising, generally, the geometric cross-section of a single gear tooth extending between adjacent root surfaces.

Spiral bevel gear 10 is exemplary of a complex gear shape which, when used in aerospace applications, must have the edges of all gear teeth deburred and chamfered. Each gear tooth will be chamfered across all edges of its heel and toe profile from root to top land and along both the concave and convex edges of the tooth.

Referring again to FIGS. 2 and 3, a chamfer 42 is formed on gear teeth 12 and 32, having a heel root segment 42a extending from upper land 30 to upper land 38, a convex segment 42b extending along the intersection of convex surface 22 and top land 38, a toe segment 42c extending from chamfer 42b to the intersection of top land 30 and concave surface 24, and a concave segment 42d extending along the intersection of top land 30 and convex surface 22 to segment 42a.

Thus, a completed, production quality gear 10 will have chamfered surfaces following the gear profiles at the heel and toe ends of each individual gear tooth as well as chamfers formed at the heel and toe ends of the top surfaces or top lands of adjacent gear teeth with all edges free from burrs. In general, the larger the gear tooth the wider the bevel. Additional operations such as hardening, grinding and polishing may be required to produce a finished, ready-to-use gear.

Figure 4:
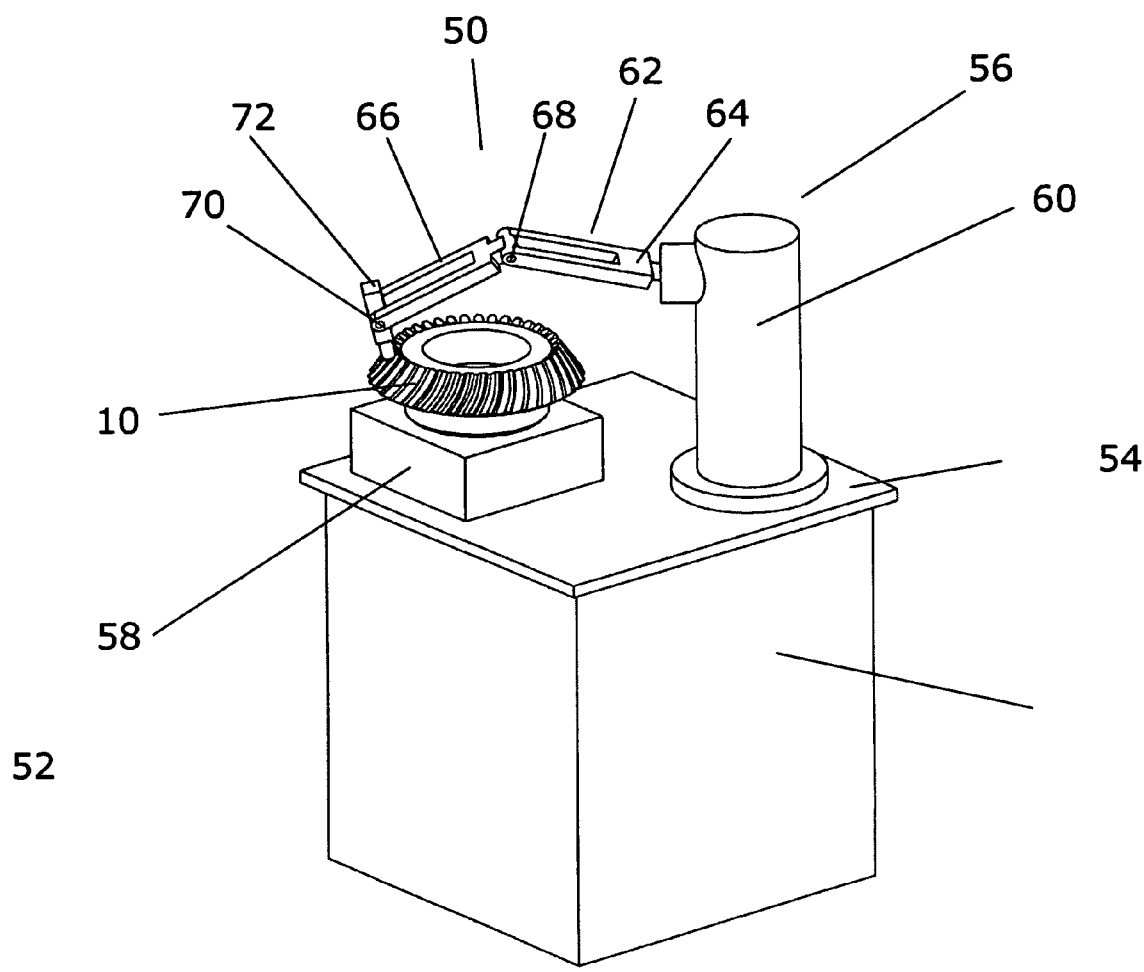
FIG. 4 is a perspective view of a work surface to which a robotic arm and chuck have been attached.

Referring to FIG. 4, the numeral 50 indicates generally a machining apparatus assembled and operated consistent with the characteristics of the present invention. A work table 52 supports a horizontal work surface 54 to which a "table top" robot 56 and an indexable chuck 58 are mounted. One such robot found useful for carrying out the present invention is the LR Mate 200i 6-axis electric servo-driven robot manufactured by FANUC Robotics North America of Rochester Hills Mich. Another is manufactured by ABB Robotics of Zurich, Switzerland. These are exemplary of such robots.

Exemplary of an indexable chuck is the HRT series of T-slotted rotary tables manufactured by Haas Automation, Inc. of Oxnard, Calif. Another is the compact CNC rotary table manufactured by Nikken Kosakusho Works of Osaka, Japan.

Figure 5:
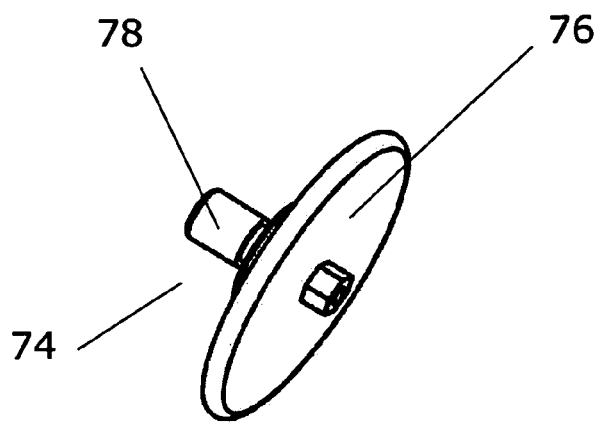
FIG. 5 is a perspective view of a machining wheel used with the apparatus in FIG. 4.
Figure 6:
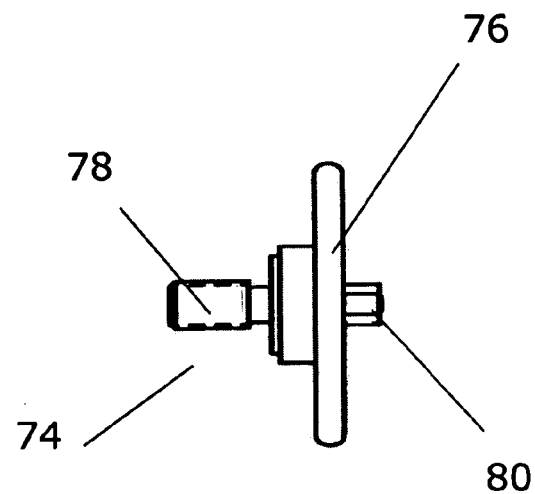
FIG. 6 is a lateral plan view of the wheel of FIG. 5.

Referring to FIG. 4, robot 56 has a robot body 60 to which is attached an articulated arm 62, the motion of which is controlled by a central processing unit (not shown) using control software provided by the manufacturer of table top robot 56. In the present invention, articulated arm 62 has a first arm segment 64 and a second arm segment 66 operatively joined at a first universal joint 68. At the outermost end 70 of second arm segment 66, a tool holder 72 is mounted. As will be described below, tool holder 72 operatively engages machining tools of various purposes. For the purposes of this embodiment of the present invention, tool holder 72 rotatably holds a machining tool 74. A preferred embodiment of one such tool is shown in perspective in FIG. 5 and a lateral view in FIG. 6. Machining tool 74 has a machining disk 76 mounted to an arbor 78 and secured with an arbor nut 80. Tool 74 is mounted to tool holder 72 by securing arbor 78 to tool holder 72 as, for example, by inserting arbor 78 into a collet or other typical clamping device.

Figure 7:
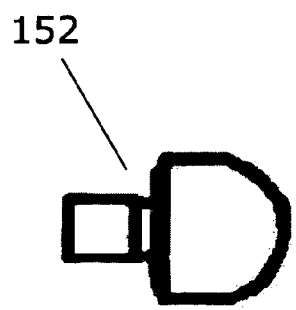
FIG. 7 is a lateral plan view of a first machining tool used to chamfer holes or other edges.
Figure 8:
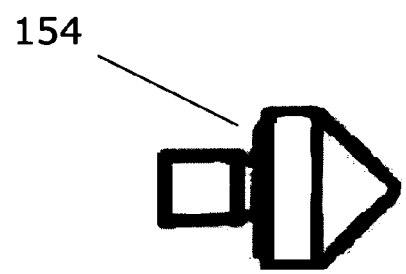
FIG. 8 is a lateral plan view of a second machining tool used to chamfer holes or other edges.
Figure 9:
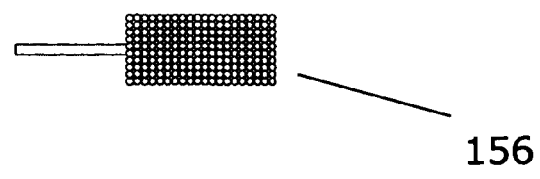
FIG. 9 is a lateral plan view of a machine tool used to hone holes or other surfaces.

Machining tools can be formed in a number of configurations depending upon the size and maneuverability required to reach and machine the workpiece surfaces. Tools intended for use as grinders can be formed from CBN while cutting tools can be formed from carbide. As seen in FIGS. 7 and 8 grinders 152, 154 are used to chamfer the edges surrounding the opening of a hole, or other sharp edges, while the reaming or honing tool 156 shown in FIG. 9 is used to finish the interior surface of a hole.

Figure 10:
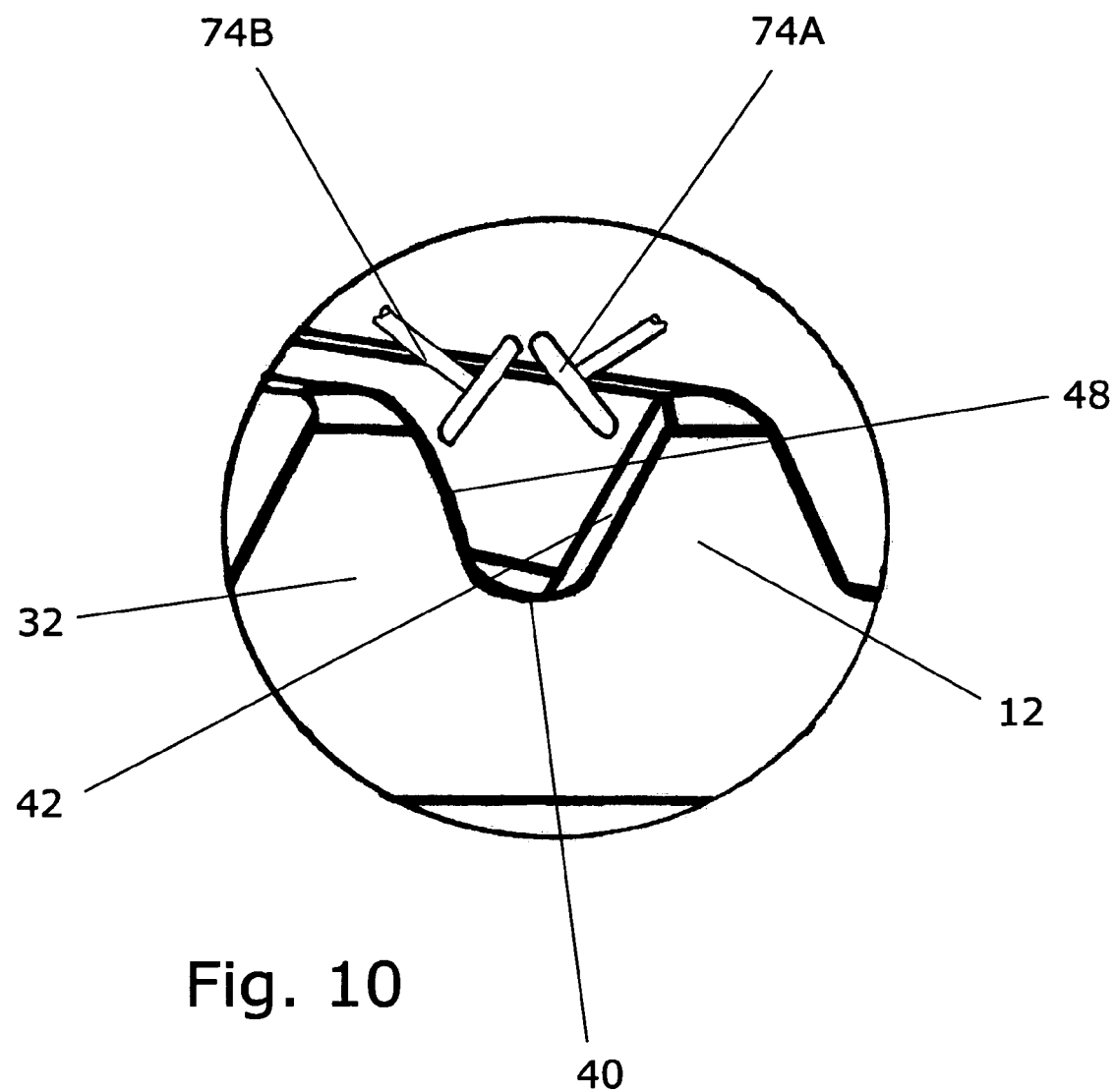
FIG. 10 is a simplified detail of the gear teeth shown in detail A showing the repositioning of the machining tool.

As seen in FIG. 10, machining tool 74 is shown in two positions, 74A and 74B. When machining profile chamfer 42 on gear tooth 12, tool 74 would be positioned in orientation 74A; when machining a chamfer on surface 48 of gear tooth 32, tool 74 would be positioned in the orientation shown at 74B. To successfully chamfer the gear tooth edges the machining tool 74 must follow the entire gear profile which requires tool 74 to constantly change orientation to follow the contours, always angled to create a chamfer of 45°.

Figure 11:
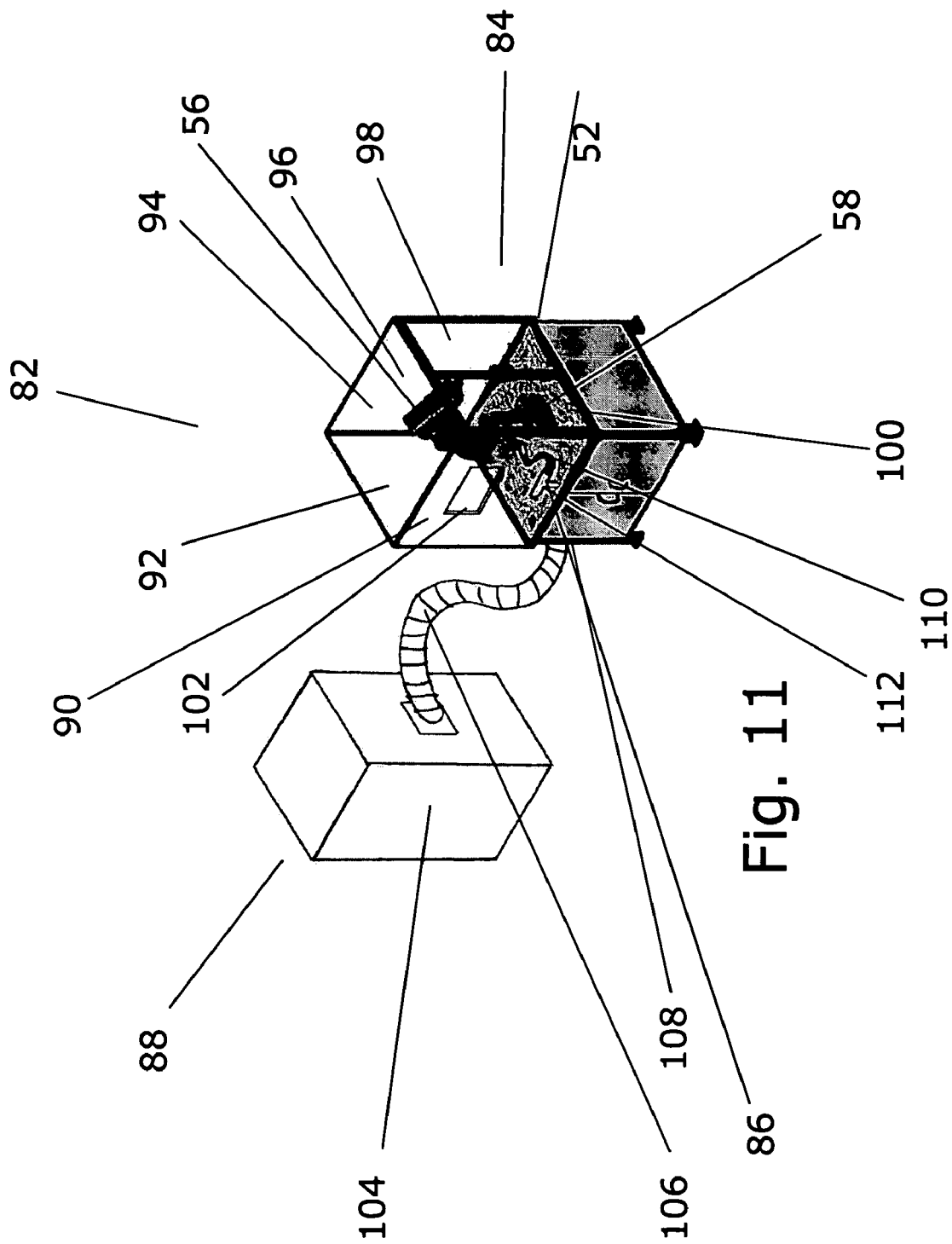
FIG. 11 is a perspective view of the arrangement of FIG. 4 as shown mounted in a work cabinet.

Referring now to FIG. 11, the numeral 82 indicates generally a preferred machining assembly consisting of a machine tool cabinet 84, air gun unit 86 and filtration unit 88. Cabinet 84 is built to enclose worktable 52, robot 56 and chuck 58 and in so doing provides important machining advantages.

In the embodiment shown in FIG. 11, cabinet 84 is joined to work table 52 and has a left panel 90 a rear panel 92, a right panel 94, a top panel 96 and a pair of front doors 98, 100 formed of a protective sheeting material such as Plexiglas®. Doors 98, 100 open to provide access to cabinet 84 to allow work pieces to be placed on chuck 58 and thereafter removed when machining is completed. An air inlet 102 is positioned on left panel 90 to allow ambient air to enter cabinet 84.

Filtration unit 88 has a filtration cabinet 104 within which are disposed a ventilating fan and a filtration system (not shown). A flexible air duct 106 extends from filtration cabinet 104 to outlet port 108 formed on worktable 52 and, thereby, to the interior of cabinet 84 by an exhaust duct not herein specifically shown. When filtration unit 88 is activated, air is drawn through inlet 102 and from cabinet 84 through flexible duct 106 thereby carrying away dust or other debris creating during machining operations. Such material is trapped within cabinet 104 by the unit's filters and later removed.

Cooling air gun unit 86 supercools ambient air to about 100° F. below the ambient air temperature and blows it through an air line 110 which is in fluid communication with air a nozzle 112 which forms the terminus of air line 110. Supercooled air is thus directed by nozzle 112 to contact the workpiece at the point that the workpiece is being machined. The flow of air cools the work piece, dissipates the heat created by the operation and helps to blow the dust and other debris created by machining away from the work site and into the cabinet where it can be trapped by filtration unit 88.

An example of a filtration unit 88 preferred for use with the present invention is manufactured by Air Flow Systems, Inc. of Dallas, Tex. An example of an air gun preferably used in connection with the present invention is the model 610 cold air gun unit manufactured by ITW Vortec of Cincinnati, Ohio, which has the capacity for cooling ambient air by 100° F.

Although the present invention has principally been discussed in terms of the operations required to machine the gear teeth on an aerospace gear, such as a spiral bevel gear, it is expected that the present invention may be useful in machining in other work pieces such as the gear housings, blades and vanes mentioned above. It is expected that larger workpieces will require larger cabinets, different cabinet configurations, different indexable chucks, different robots and possible a robot to load and unload workpieces. The operating principles of the present invention can be applied to these various equipment configurations.

Figure 12:
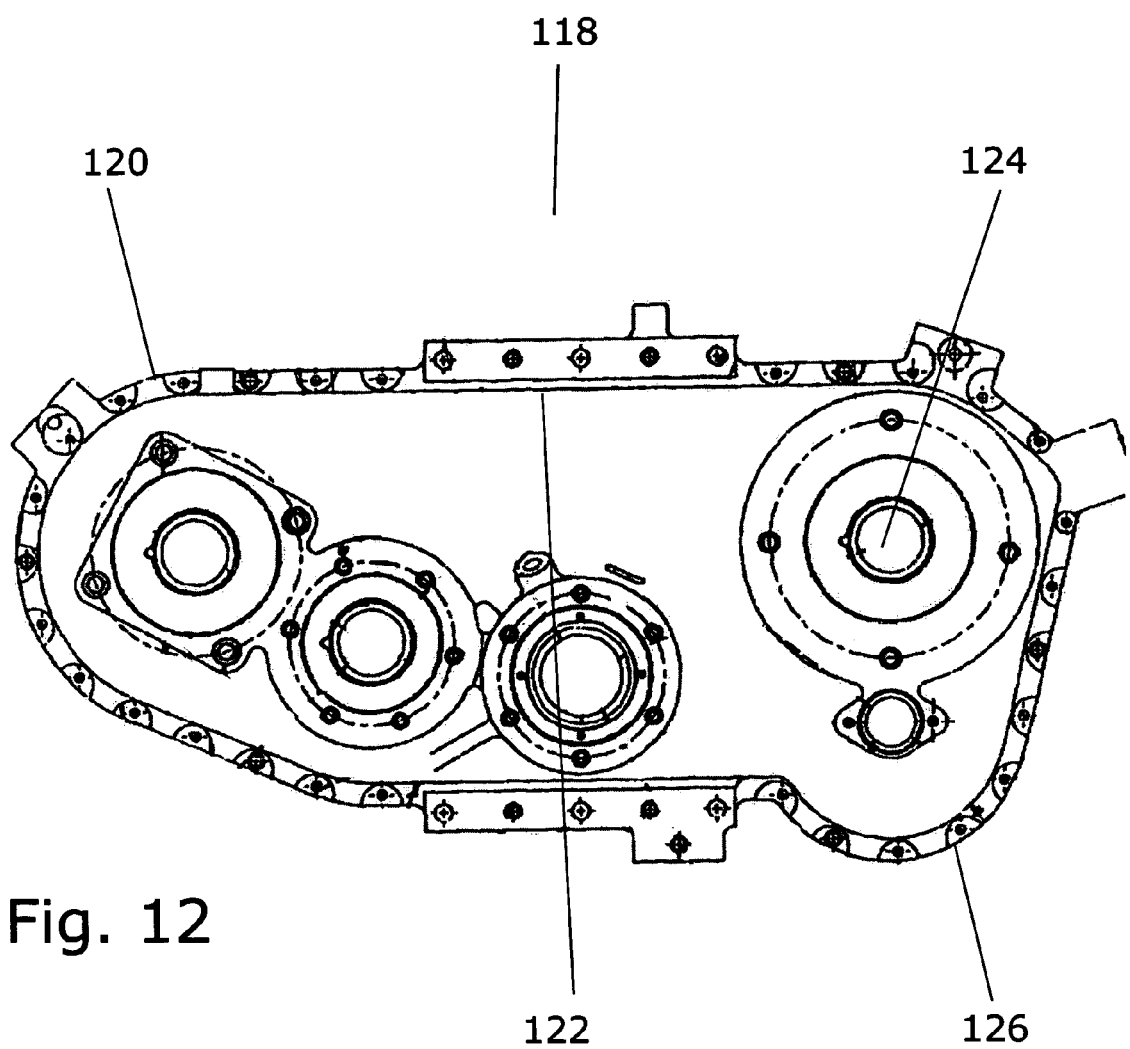
FIG. 12 is a schematic view of a gear housing showing various types of surfaces to be machined by use of the present invention.

Referring now to FIG. 12, the numeral 118 represents schematically a gear housing generally formed from metals such as aluminum or magnesium or alloys thereof in a casting process. Gear housing 118 has an exterior surface 120 and an interior housing surface 122 and, shown as representative of common aspects of such housings, are through hole 124 and blind hole 126. Use of the present invention to machine a work piece such as housing 118 follows the same principles as that of machining complex gears. A gage file is created from a line or CAD drawing of the housing and a data set is generated. Even though the housing may be cast rather than milled by a computer controlled milling machine, the contours of the housing are accurately identified and characterized by the enhanced CAD model, making it possible to program robot 56 to follow the interior or exterior contours of housing 118 and to perform an number of additional operations such as polishing, buffing, drilling, reaming, deburring and chamfering holes such as through hole 124 or blind hole 126.

To accomplish these tasks, a robot 56 with the capability of changing tools to perform different operations on a single work piece is used. Such robots are well known in the industry and one example of a system which gives such a robot the capability of changing tools to perform different operations is the QC-11 Tool Mount and Tool Holder system manufactured by ATI Industrial Automation of Apex, N.C. In the present example, a deburring tool would be used to debur the exterior surface 120 or interior surface 122 of housing 118.

Figure 13:
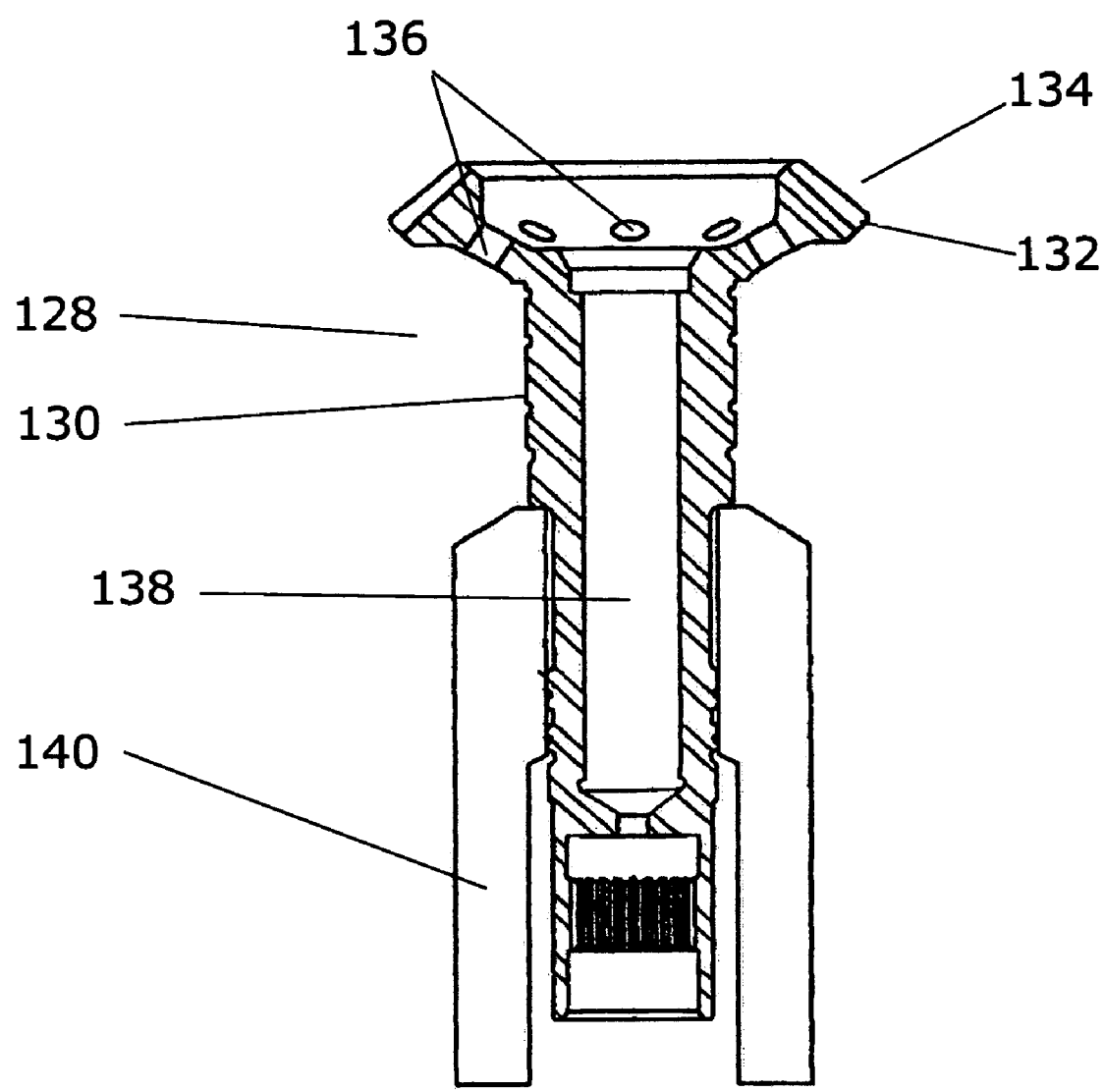
FIG. 13 is a lateral plan view of a stem gear.

Referring now to FIG. 13 the principles of the present invention are applied to machine a stem gear 128. Gear 128, shown in section, has a drive stem 130 crowned with a gear 132 having a series of gear teeth 134 formed about its upper periphery. Holes 136 are formed through gear 128 for purposes of ventilation or to make gear 128 lighter in weight. An axial bore 138 is formed therethrough to serve as a mounting channel.

When being machined, gear 128 is held in indexable chuck 140 and, in successive operations, robot 56 is used to deburr and chamfer teeth 134, chamfer and ream holes 136 and chamfer and hone bore 138, changing tools when necessary to perform other machining operations.

Figure 14:
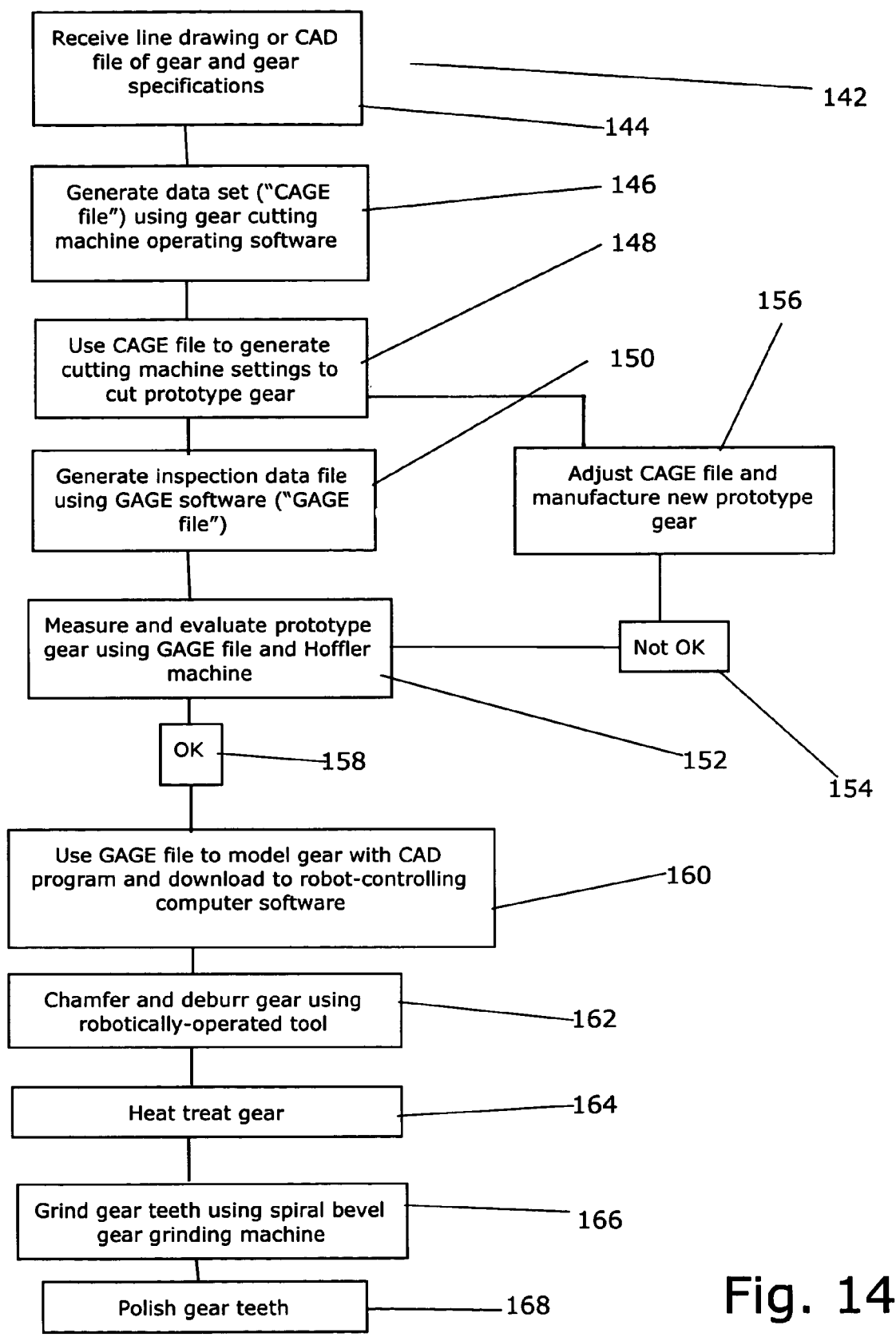
FIG. 14 is a flow diagram of the steps for programming a robotic arm to carry out selected machining processes.

Referring now to FIG. 14 the numeral 142 indicates a flow diagram detailing the manufacturing steps for complex spiral bevel gears. At numeral 144, specifications for the gear to be manufactured are furnished by the customer in the form of a line or CAD drawing, a set of written specifications detailing such parameters as the number of gear teeth, the pitch and angle of the teeth, the addendum or dedendum of the gear surfaces, the face angle of the blank, the gear root angle, the outside diameter of the gear, and for spiral bevel gears, the direction of the spiral.

At numeral 146, a gear design engineer generates a series of settings from the specifications by using a computer program such as the CAGE program described above. Typically such programs are furnished by the manufacturer of the gear-cutting machine used to manufacture the gear.

At numeral 148 the settings are used to direct the gear cutting machine to manufacture a prototype gear from a metallic blank.

At numeral 150 an inspection data file is created using software such as the GAGE software described above. The inspection data file is a virtual model of the gear tooth cut by the gear cutting machine.

At numeral 152, the inspection data file is used to inspect the prototype gear for accuracy and other manufacturing specifications on a testing machine such as the Hoffler Zeiss machine described above.

At numeral 154 if the prototype is found to be unsatisfactory the gear engineer is notified and, at numeral 156, makes adjustments using the CAGE program and another gear is manufactured at step 148. This cycle is repeated until a satisfactory prototype gear is produced whereupon, at numeral 158, the gear is sent to the robotic apparatus described above for chamfering and deburring.

To program robot 56 for chamfering and deburring, the correct GAGE file is used to model the gear within the robot's controlling software at 160.

At numeral 162 the gear is robotically chamfered and deburred as described in detail above.

At numeral 164 any required heat treating is carried out. Thereafter, at numeral 166 the gear teeth are ground by a grinding machine designed specifically to grind spiral bevel gear teeth.

Finally, at numeral 168 the gear tooth chamfers are polished robotically, again using the GAGE file data set to control the robotic polishing operations.

What is claimed is:

1. A method for manufacturing a complex spiral gear from a blank, said method comprising the steps of:

using a first computer program to create a first data set that identifies the contours of said gear;

using said first data set to set the operating parameters of a gear-cutting machine;

cutting a gear from said blank with said gear-cutting machine;

using a second computer program to generate a second data set for the purpose of measuring and inspecting said gear;

measuring and inspecting said gear by a gear-inspection machine operated by said second computer program;

mounting said gear to a rotatable, indexable chuck;

using a third computer program to generate a computer model of the contours of said gear, said third computer program adapted to operate said indexable chuck and a robotic work arm;

mounting a first selected machining tool on said robotic work arm;

using said third computer program to operate said work arm to bring said first machining tool into contact with a first selected portion of said gear contours;

conducting a first machining operation upon said first gear contour portion;

operating said indexable chuck to bring a second selected portion of said gear contour into position to be machined;

using said third computer program to operate said work arm to bring said first machining tool into contact with said second selected portion of said gear contours;

conducting said first machining operation upon said second gear contour portion; and continuing to reindex and machine said gear until all contours desired to be machined have been machined.

2. The method of claim 1 including the steps of:
removing said first machining tool and replacing it with a second machining tool to carry out a second machining operation;
using said third computer program to operate said work arm to bring said second machining tool into contact with a third selected portion of said gear contours;
conducting said second machining operation upon said third gear contour portion;
operating said indexable chuck to bring a fourth selected portion of said gear contour into position to be machined;
using said third computer program to operate said work arm to bring said second machining tool into contact with said second selected portion of said gear contours;
conducting said second machining operation upon said fourth gear contour portion; and
continuing to reindex and machine said gear until all contours desired to be machined have been machined.

3. The method of claim 2 wherein said machining operation is selected from the group of chamfering deburring, honing, reaming, grinding, polishing, buffing and drilling.

4. The method of claim 1 wherein said machining operation is selected from the group of chamfering deburring, honing, reaming, grinding, polishing, buffing and drilling.

5. A method for manufacturing a complex spiral gear from a blank, said method comprising the steps of:
using a first computer program to create a first data set that identifies the contours of said gear;
using said first data set to set the operating parameters of a gear-cutting machine;
cutting a prototype gear from said blank with said gear-cutting machine;
using a second computer program to generate a second data set for the purpose of measuring and inspecting said prototype gear;
measuring and inspecting said prototype gear with a gear-inspection machine operated by said second computer program;
correcting any detected errors in said prototype gear by resetting said gear-cutting machine operating parameters and manufacturing a second prototype gear;
repeating said prototype manufacture and inspection steps until a final of said prototype gears meets desired gear specifications;
using a third computer program to generate a computer model of the contours of said final prototype gear,
said third computer program adapted to operate an indexable chuck and a robotic work arm;
using said gear-cutting machine parameters to cut a production gear;
mounting said production gear to said rotatable, indexable chuck;
mounting a selected machining tool on said robotic work arm;
using said third computer program to operate said robotic work arm to bring said machining tool into contact with a first selected portion of the contours of said production gear;
carrying out a first machining operation upon said first production gear contour portion;
operating said indexable chuck to bring a second selected portion of said production gear contour into position to be machined;
using said third computer program to operate said work arm to bring said machining tool into contact with said second selected portion of said production gear contours;
carrying out said first machining operation upon said second selected production gear contour portion; and
continuing to reindex and machine said production gear until all contours desired to be machined have been machined.

6. The method of claim 5 wherein a succession of said machining operations are carried out upon said workpiece.

7. The method of claim 5 wherein said machining operation is selected from the group of chamfering deburring, honing, reaming, grinding, polishing, buffing and drilling.

8. Apparatus for manufacturing a workpiece from a blank, said apparatus comprising:
a cutting machine having machine settings adjustable to cut the contours of said workpiece from said blank;
a first computer program to create a first data set that identifies said contours of said workpiece,
said cutting machine settings determined by said first data set;
an inspection machine adapted to perform measurements upon said workpiece contours,
a second computer program to transform said measurements into a second data set;
a robotically-controlled machining arm,
said arm adapted to receive and operate a multiplicity of machining tools responsive to a third computer program;
an indexable chuck adapted to hold said workpiece and rotate said workpiece to bring said workpiece into a selected position;
a third computer program to control the movements of said arm and said chuck,
said third computer program adapted to use said second data set to control said chuck and said arm whereby a selected of said tools is brought into contact with a first selected portion of said contours to carry out a machining operation upon said contour and said chuck is operated to bring successive portions of said contours into position to be machined until all contours desired to be machined have been machined.

9. The apparatus as recited in claim 8 further comprising a work cabinet within which said arm and said chuck are positioned.

10. The apparatus as recited in claim 9 further comprising means for collecting dust and debris created by said machining operation,
said collecting means including a hood forming the upper portion of said cabinet,
an air inlet formed through said hood;
a cabinet base having an air outlet;
a vacuum filtration unit; and
a duct extending from said air outlet to said filtration unit.

11. The apparatus as recited in claim 8 further comprising means for cooling said workpiece during said machining operation;
said cooling means including means for supercooling ambient air;
means for directing said supercooled air to impinge upon said workpiece proximate the site of said machining operation.

12. The apparatus of claim 8 wherein said machining tools include tools to cany out the operations of chamfering, deburring, honing, reaming, grinding, polishing, buffing and drilling.

* * * * *